UNITED STATES PATENT OFFICE 2,308,835

POLYNUCLEAR CYCLIC OXYKETONES AND DERIVATIVES THEREOF AND PROCESS OF MAKING SAME

Leopold Ruzicka, Zurich, and Albert Wettstein, Basel, Switzerland, assignors, by mesne assignments, to Ciba Pharmaceutical Products, Incorporated, Summit, N. J., a corporation of New Jersey No Drawing. Original application June 15, 1936, Serial No. 85,437. Divided and this application August 16, 1937, Serial No. 159,433. In Switzerland June 18, 1935

20 Claims. (Cl. 260—397.4)

The present application is a division of applicants' prior application Ser. No. 85,437, filed June 15, 1936.

Isomeric oxyketones of the saturated or unsaturated androstane-series, whose hydroxyl and keto-groups in comparison with the compounds of the androsterone series are interchanged, are not yet known.

This invention is based on the observation that such new oxyketones and their esters are obtainable by partially saponifying a diester of a diol of the type of the saturated or unsaturated androstane-diols-(3:17), oxidizing the free carbinol-group (in 3-position) thus produced (if necessary with temporary protection of the double bonds present) to a keto-group and, if desired, purifying and saponifying the keto-ester thus obtained.

A particularly advantageous procedure consists in starting from a mixed di-ester of a diol of the type of the saturated or unsaturated androstane-diols, particularly those esters in which the hydroxyl group in 3-position is esterified with an acid radical which is comparatively easily saponifiable, whilst that in 17-position is esterified by an acid radical which is saponifiable with comparative difficulty. One can also start from a free diol, partially esterify this and oxidise the resulting diol, mono-esterified in 17-position, in the manner described above, advantageously after purification.

The same oxyketone can be produced by subjecting the free diol, if desired with temporary protection of double bonds present, directly to a partial oxidation and separating from the reaction product the compound which has undergone oxidation at the 3-position.

Finally, it is also possible to obtain those new oxyketones by subjected to a partial reduction a diketone of the type of the androstane-dione-(3:17) and separating from the reduction product the 3-keto-17-oxy-compound.

The carbinol-group in 3-position can also be oxidized to a keto-group by the action of a dehydrogenating agent.

The various methods may be illustrated by the following formulae, in which $Ac_1$ and $Ac_2$ mean the same or different acyl radicals and R represents hydrogen or a monovalent hydrocarbon radical:

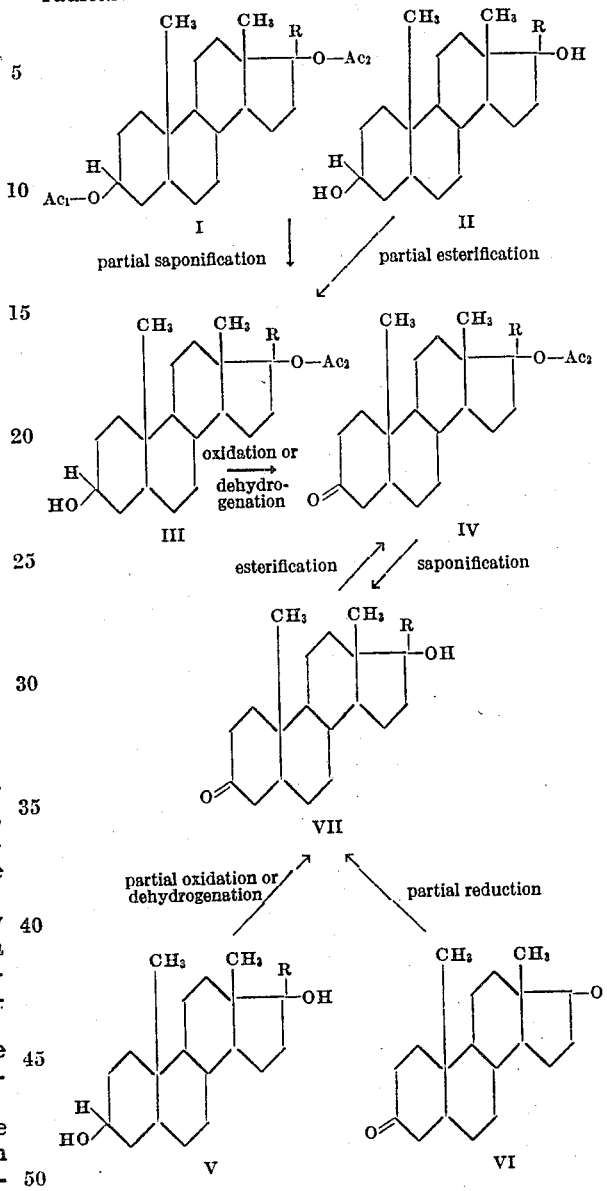

As suitable oxidizing agents for converting III into IV or for converting V into VII there may be used, for example, a hexavalent chromium compound such as chromic acid in glacial acetic acid; furthermore copper oxide and the like. In the oxidation of an unsaturated diol or its ester to an oxyketone or its ester the carbon double linkage is advantageously protected from the action of the oxidizing agent, for example by the attachment of halogen of hydrogen halide; after oxidation the halogen is then again removed, for example by treatment with zinc in glacial acetic acid or benzene, with catalytically activated hydrogen or with an alkali iodide, or the hydrogen halide is again removed by treatment with an alkaline agent such as a tertiary base. The conversion of the free diols into 3-keto-17-oxy-compounds by oxidation of the 3-carbinol-group proceeds in a particularly advantageous manner in cases in which the nuclear carbon atom in 17-position is linked to a hydrocarbon radical.

When a mixed di-ester is to be subjected to partial saponification there are advantageously used those which contain in 3-position the radical of a lower fatty acid such as acetic acid or formic acid, and in 17-position the radical of a higher fatty acid such as a valeric acid, or a carbamic acid, benzoic acid, a toluic acid, hexahydrobenzoic acid, or a hydrohalogen acid.

The aforesaid mixed di-esters are obtained by causing to act on a 3-mono-ester of a diol of the type of the saturated or unsaturated androstane diols an acylating agent containing an acid radical different from that already present in the molecule of the mono-ester.

The partial saponification may be conducted, for example, in methyl alcohol, ethyl alcohol, in a higher alcohol, in dioxane, acetone or the like. If an alcohol is used re-esterification generally occurs in addition to the actual saponification, so that the quantity of alkali solution consumed is frequently considerably less than the calculated quantity. One is therefore not restricted to the use of the calculated quantity of alkali, but may use a larger or a smaller quantity. By this means, as well as by the concentration of the alkali solution and the temperature, the duration of the reaction may be favorably influenced.

Suitable acylating agents for converting II into III and for converting VII into IV are, for instance, acids, acid halides and acid anhydrides, for example benzoic acid, acetic acid, formic acid, benzoyl chloride, acetyl chloride, acetic anhydride and the like, if required in the presence of an acid binding agent such as a tertiary base or an alkali. Particularly when an acid halide or an acid anhydride is used there is advantageously taken for the partial esterification of II only a quantity of acylating agent sufficient for esterifying one hydroxyl-group.

In the partial reduction of VI the hydrogenation is interrupted when there has been absorbed a quantity of hydrogen sufficing for the reduction of one carbonyl-group.

For the dehydrogenation of the carbinol-group to the keto-group there may be used with advantage any of the usual dehydrogenating agents, for instance selenium, sulfur, or a metallic catalyst belonging to the group of hydrogenating or dehydrogenating catalysts such as copper, platinum, palladium, gold, nickel and the like, if desired in the presence of a hydrogen acceptor such as naphthalene, phenol, cynnamic acid, fumaric acid or the like.

It is easily possible to isolate in a pure form the oxyketone produced either by direct crystallization or by preparing a suitable derivative. Such derivatives are obtained, for example, by reaction with the usual ketone reagents such as semi-carbazide, thiosemicarbazide, hydroxylamine, aminoguanidine, phenylhydrazine and its substitution products, neutral or basic acylhydrazides. For purification and separation acylation is often useful, for example by means of acetic anhydride, benzoyl chloride, dinitro-benzoyl chloride or the like. By the action of hydrolytically acting agents the above compounds can be split into their components. For separating the 3-keto-compound from any 3-oxy-compound which may have been formed as a by-product there have been proved advantageous also the saponines such as digitonine especially when the steric arrangement of the hydroxyl-group in 3-position corresponds with that of cholesterol.

Among the diols of the type of the saturated or unsaturated androstane-diols-(3.17) there are to be understood not only the stereo-isomeric androstane-diols in question themselves, but also their nuclear substitution products, for example the compounds substituted in 17-position by a hydrocarbon radical such as an alkyl-, aralkyl- or aryl-group; so also the scope of the 3:17-androstane-diones extends also to the isomeric 3:17-aetiocholanediones. The following diols, for example, are suitable parent materials for the invention: the androstane-diols-(3:17), the $\Delta^{4:5}$ or $\Delta^{5:6}$-androstene-diols-(3:17), the 17-methyl- or 17-ethyl-androstane-diols-(3:17), the 17-methyl- or 17-ethyl-androstene-diols-(3:17), in which in each case the carbinol-groups in both 3- and 17-positions may be in cis-, or epi-, or in trans-position. Suitable parent materials of the dione-series are among others the androstane-dione-(3:17), the $\Delta^{4:5}$-androstene-dione-(3:17) and the aetiocholane-dione-(3:17).

The new oxy-ketones as well as their esters have powerful effects on the combs of capons and also on the seminal vesicle.

The following examples illustrate the invention:

*Example 1*

3.76 grams of andostane-diol-(3,17)-diacetate of the formula

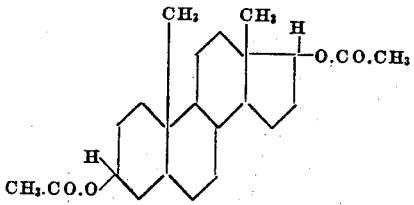

of melting point 127–128° C. are allowed to stand for 48 hours at room temperature in 1000 cc. of n/100-methyl-alcoholic potash solution. After concentrating the solution, the 17-acetoxy-androstane-ol-(3), produced by the partial saponification, is precipitated by addition of water, filtered, washed with water and dried in a vacuum over phosphorus pentoxide. It may be used without further purification for making androstane-ol-(17)-one-(3). For this purpose the product is dissolved in 50 cc. of glacial acetic acid and there is added, while cooling, a solution of 0.8 gram of chromium trioxide in 25 cc. of acetic acid of 90 per cent. strength. After standing for 14 hours at room temperature some methanol is added for the purpose of reducing the small excess of chromic acid. The solution is diluted with water and the precipitate formed dissolved in ether. The ethereal solution is washed with dilute sodium carbonate solution and water and evaporated. From the residue the acetate of androstane-ol-(17)-one-(3) of melting point 158.5–159.5° C. is isolated, preferably by means of the sparingly soluble semicarbazone, which may be purified by recrystallization from absolute alcohol. By heating the semicarbazone for an hour in a mixture of sulfuric acid of 70 per cent. strength and alcohol (1:2) it is directly saponified to androstane-ol-(17)-one-(3) of the formula

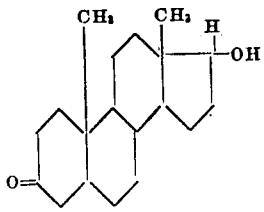

By recrystallization from hexane or dilute alcohol the latter may be purified. It forms colorless crystals of melting point 182° C.

Instead of the acetate there may also be used the propionate or the butyrate.

*Example 2*

3.74 grams of $\Delta^{5:6}$-androstene-diol-(3:17)-diacetate of the formula

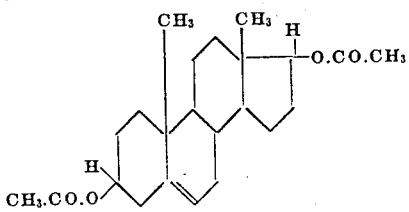

of melting point 165–166° C., in which the two hydroxyl groups are probably in trans-configuration, are allowed to stand at room temperature for 40 hours in 1000 cc. of methyl alcohol to which have been added previously 0.45 gram of potassium hydroxide. After neutralizing, the solution is strongly concentrated in a vacuum and then the crude $\Delta^{5:6}$-17-acetoxy-androstene-ol-(3), which has been produced by partial saponification, is precipitated by addition of water, extracted with ether and obtained by evaporation of the ether. The crude mono-ester thus obtained is purified by recrystallization from hexane, with removal of sparingly soluble constituents and the purified ester of melting point 146–148° C. is taken up in 50 cc. of glacial acetic acid and, while cooling, there is added, drop by drop, a solution of bromine in glacial acetic acid as long as there is immediate decolorization. Finally, also in the cold, there is added 1 gram of chromium trioxide dissolved in 30 cc. of acetic acid of 90 per cent. strength and the whole is allowed to stand overnight at room temperature. The whole is then poured into 1 liter of water, the precipitated product is filtered and washed with much water. The brominated ketone thus obtained is dissolved for the purpose of debrominating it in 50 cc. of glacial acetic acid, and after addition of 20 grams of zinc dust the whole is heated while vigorously shaking for 12 minutes on the boiling water-bath. There follow filtration through a glass filter, washing with a little hot glacial acetic acid, precipitating the solution with water and extraction with ether. The ethereal solution is washed with dilute sodium carbonate solution and water and then evaporated to yield a residue, from which $\Delta^{4:5}$-androstene-ol-(17)-one-(3)-acetate may be isolated by means of its semicarbazone, and after recrystallization from hexane melts at 141° C. By saponification it may be converted into the free oxyketone, namely $\Delta^{4:5}$-androstene-ol-(17)-one-(3) of the formula

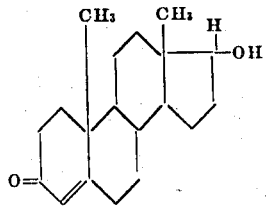

which melts at 155° C. When using other esters, there are obtained the corresponding keto-esters in an analogous manner, for instance $\Delta^{4:5}$-androstene-ol-(17)-one-(3)-benzoate of melting point 194–195° C.

|  | °C. |
|---|---|
| The propionate of melting point | 121–123 |
| The n-butyrate of melting point | 111–113 |
| The iso-butyrate of melting point | 131–133 |
| The n-valerianate of melting point | 109–111 |
| The n-caprinate of melting point | 55– 57 |
| The palmitate of melting point | 72– 74 |
| The stearate of melting point | 79– 80 | which esters may be saponified, if desired.

The double linkage may be protected by chlorine, for example, instead of bromine.

*Example 3*

1.87 grams of $\Delta^{5:6}$-3-trans-17-cis-androstenediol-diacetate of the formula

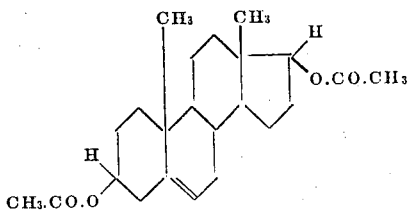

of melting point 168° C. are dissolved in 370 cc. of methanol and the solution is mixed with a solution of 0.28 gram of potassium hydroxide in a small quantity of methanol. The whole is allowed to stand at 15° C. for 36 hours, whereupon it is exactly neutralized with dilute hydrochloric acid, and the solution is concentrated in a vacuum to 50 cc. It is then diluted with water and the reaction product is taken up in ether and the ethereal solution is dried and evaporated. By fractionally crystallizing the residue from hexane, the 17-mono-acetate of $\Delta^{5:6}$-3-trans-17-cis-androstene-diol is obtained. This is dissolved in 30 cc. of glacial acetic acid and treated with the calculated quantity (1 mol) of bromine in glacial acetic acid. The bromine is immediately decolorized. There is then added a solution of 1 mol of chromic acid in acetic acid of 90 per cent. strength and the whole is allowed to stand overnight at room temperature. The reaction product is then precipitated by addition of water, filtered, debrominated by shaking in an alcoholic solution for 48 hours with zinc dust and finally purified by recrystallization from hexane. From the acetate of $\Delta^{4:5}$-androstene-cis-ol-(17)-one-(3) of melting point 115° C. there is obtained by saponification with methyl alcoholic potash of 2 per cent. strength the Δ⁴:⁵-androstene-cis-ol-(17)-one-(3) of the formula

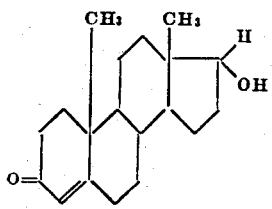

of melting point 220–221° C.

Δ⁵:⁶-3-trans-17-cis-androstene-diol - diacetate is obtained by acetylation of Δ⁵:⁶-3-trans-17-cis-androstene-diol-3-acetate, which is itself formed together with 3-trans-17-trans-diol-3-acetate by hydrogenation of Δ⁵:⁶-trans-dehydroandrosterone-acetate.

Example 4

2.31 grams of Δ⁵:⁶-3-trans-17-trans-androstene-diol-3-acetate-17-benzoate of the formula

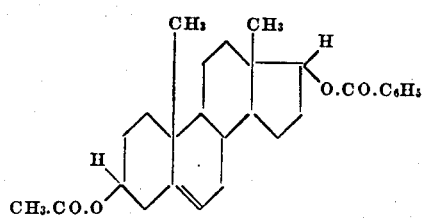

of melting point 178–180° C. are mixed with 500 cc. of methyl alcohol. The mixture is stirred for a long time (about 50 hours) at room temperature and there is added, gradually by drops, a methyl alcoholic solution of 0.3 gram of potassium hydroxide. After neutralization the whole is highly concentrated in a vacuum; the crude product is precipitated by the addition of water, extracted by means of ether and the ethereal solution is evaporated. The residue is crystallized from hexane, yielding brilliant needles of melting point 222–223° C. of the Δ⁵:⁶-3-trans-17-trans-androstene-diol-17-benzoate.

This mono-ester is dissolved in 50 cc. of glacial acetic acid and there is added, while cooling and in drops, the calculated proportion of a solution of bromine in glacial acetic acid. Finally, 0.5 gram of chromium trioxide dissolved in 15 cc. of acetic acid of 90 per cent. strength is added in the cold and the whole is allowed to stand over-night at room temperature, during which time the oxidation product in part crystallizes. The mass is then poured into water, the precipitated matter filtered and washed with much water. The brominated ketone thus obtained is debrominated by violent agitation with zinc dust in glacial acetic acid on the boiling water-bath. The mass is then filtered, washed and the solution precipitated by means of water. The precipitate is extracted with ether, the ethereal solution shaken with dilute sodium carbonate solution and water and evaporated. It is also possible to debrominate the brominated ketone by heating a dry solution of it in benzene with an alcoholic solution of sodium iodide. In this case the solution is subsequently washed with aqueous sodium sulfite solution and water and evaporated.

From the crude product made by one or the other of these methods may be obtained, for instance by recrystallizing it from hexane or by sublimation in a high vacuum or by both methods, or by means of the sparingly soluble semi-carbazone, the Δ⁴:⁵-androstene-trans-ol-(17)-one-(3)-benzoate of melting point 193–194° C. By saponification with alcoholic potash this benzoate may be converted into the free oxyketone, namely Δ⁴:⁵-androstene-trans-ol-(17)-one-(3) of the formula

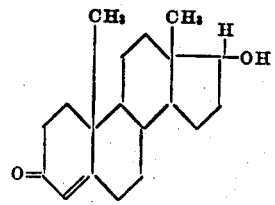

of melting point 155° C.

In a similar manner by partial saponification of Δ⁵:⁶-3-trans-17-cis-androstene-diol-3-acetate-17-benzoate of melting point 133–134° C. oxidation of the Δ⁵:⁶-3-trans-17-cis-androstene-diol-17-benzoate of melting point 150–151° C. and subsequent saponification of the Δ⁴:⁵-androstene-cis-d-(17)-one-(3)-benzoate of melting point 135–136° C. there is obtained the Δ⁴:⁵-androstene-cis-ol-(17)-one-(3) described in Example 3.

Instead of chromic acid, copper oxide for example can be used for oxidizing the androstene-diol-17-benzoate.

Example 5

Into 1 liter of ethyl alcohol which has been preheated to 30° C. there are introduced first 5 grams of Δ⁵:⁶-androstene-3:17-diol-3-acetate-17-benzoate of the formula

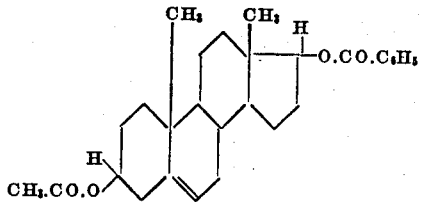

of melting point 178–180° C. and then one molecular proportion of an ethyl alcoholic potash solution (containing 0.64 gram of potassium hydroxide) and the whole is thoroughly stirred for 4 hours at the aforesaid temperature. The solution is neutralized (the quantity of alkali consumed amounting to about 10 per cent.) and then highly concentrated in a vacuum and the crude product is shaken with water and ether, the ethereal solution is separated and evaporated. By crystallizing the residue from isopropyl ether Δ⁵:⁶-androstene-3:17-diol-17-benzoate is obtained in the form of brilliant needles of melting point 222–223° C.

This mono-ester is oxidized with chromic acid, after bromination in glacial acetic acid, in a manner analogous to that described in Example 2. For debrominating the brominated ketone thus obtained the ketone is dissolved in benzene, the solution is carefully dried and then boiled for 3 hours in a reflux apparatus together with a solution of sodium iodide in absolute alcohol. The reaction mixture is poured into a sodium sulfite solution of 2 per cent. strength, the benzene layer which separates is removed, shaken further with a sodium sulfite solution and with a bicarbonate solution and then evaporated. It is also possible to debrominate the brominated ketone, for example, by the action of zinc in glacial acetic acid or in a mixture of benzene and alcohol. In these cases the reaction mixture is filtered, the filtrate is mixed with water and ether and after separation into layers the upper layer is washed with a dilute sodium carbonate solution and with water and then evaporated. The crude Δ⁴:⁵-androstene-3-one-17-ol-benzoate of the formula

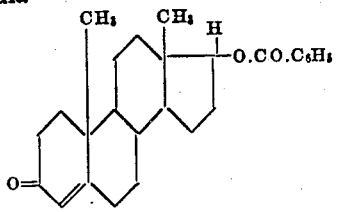

thus obtained may be purified just as described in Example 4.

In comparison with the use of a methyl alcoholic potash solution the use of an ethyl alcoholic potash solution considerably shortens the duration of the reaction. Propyl, butyl and amyl alcohols have also proved advantageous in this respect.

*Example 6*

2.1 grams of androstane-diol-(3:17) of the formula

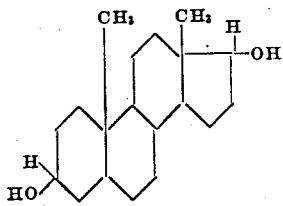

of melting point 223° C. are heated in 100 cc. of acetic acid of 90 per cent. strength for 8 hours on the water-bath, and then allowed to stand overnight at room temperature. The reaction product is precipitated with water, pressed and dried in a vacuum over phosphorus pentoxide. By systematically treating it with benzine (boiling range 70–80° C.) it is separated into sparingly soluble and more easily soluble fractions. The sparingly soluble fraction is unchanged diol. By recrystallization of the more easily soluble fraction from dilute alcohol there is obtained the 17-mono-acetate of androstane-diol-(3:17) which melts at 192° C. This ester is oxidized in the manner described in Example 1, and if required the oxidation product is saponified to yield androstane-ol-(17)-one-(3) of the formula

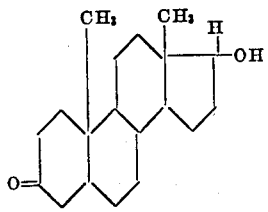

of melting point 182° C.

*Example 7*

2.9 grams Δ⁵:⁶-androstene-diol-(3:17) of the formula

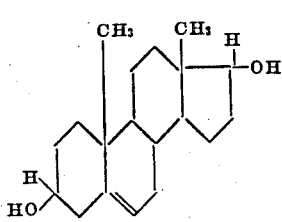

of melting point 182–183° C. and 0.8 gram of acetyl chloride are brought to reaction in pyridine. The reaction mixture is poured into water, the pyridine is neutralized by addition of an acid, the precipitated crude product is extracted with ether and the ethereal solution is washed and evaporated. Fractional crystallization of the residue from hexane yields pure Δ⁵:⁶-17-acetoxy-androstene-ol-(3) of melting point 146–148° C. The mono-ester so obtained is brominated, oxidized with chromic acid in glacial acetic acid and debrominated with zinc dust and acetic acid in the manner described in Example 2, whereby there is obtained in the keto-ester, namely Δ⁴:⁵-androstene-ol-(17)-one-(3)-acetate of melting point 141° C., which if required can be converted by saponification into the Δ⁴:⁵-androstene-ol-(17)-one-(3) of the formula

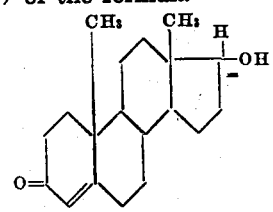

of melting point 155° C.

In an analogous manner by partial benzoylation instead of acetylation Δ⁵:⁶-androstene-diol-(3:17) can be converted by way of its 17-mono-benzoate of melting point 222–223° C. into the Δ⁴:⁵-androstene-ol-(17)-one-(3)-benzoate of melting point 194–195° C.; if required the latter can be converted by saponification into the above described Δ⁴:⁵-androstene-ol-(17)-one-(3) of melting point 155° C.

*Example 8*

2 grams of Δ⁵:⁶-androstene-3:17-diol-17-benzoate of the formula

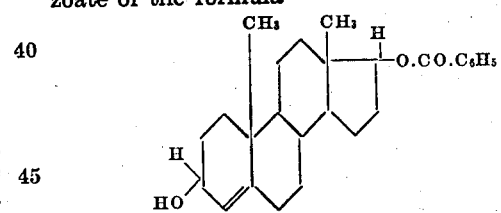

of melting point 222–223° C., obtainable as an intermediate product in the processes of Examples 4, 5 and 7, and 2 grams of copper powder are heated at 225° C. in a vacuum until evolution of gas has ceased. The mass is then treated with 20 cc. of alcohol, the solution filtered, the solid matter washed and the filtrate is poured into 200 cc. of water and extracted with ether. The ethereal solution is washed with sodium carbonate solution and water and evaporated. From the residue the Δ⁴:⁵-androstene-ol-(17)-one-(3)-benzoate of melting point 193–194° C. is isolated, for example by re-crystallization from isopropyl ether and/or sublimation in a high vacuum or by conversion into its sparingly soluble semicarbazone. By saponification with alcoholic alkali solution the benzoate is converted into the free oxy-ketone, namely Δ⁴:⁵-androstene-ol-(17-one-(3) of the formula

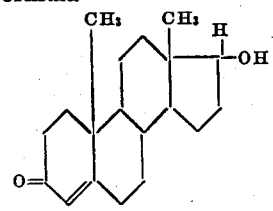

of melting point 155° C.

Instead of starting from the 17-monobenzoate the Δ⁵:⁶-androstene-3:17-diol may be used and converted directly into the free Δ⁴:⁵-androstene-ol-(17)-one-(3).

Instead of copper another metal catalyst such as palladium, platinum, silver or the like can be used for the dehydrogenation.

*Example 9*

2 grams of androstane-3:17-diol-17-acetate of the formula

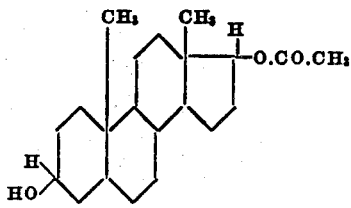

of melting point 192° C., obtainable as an intermediate product in the process of Examples 1 and 6, and 2 grams of cinnamic acid are dissolved in 100 cc. of glacial acetic acid and the solution is shaken while warm with a palladium catalyst. When the reaction is at an end the catalyst is filtered and the filtrate is poured into 800 cc. of water and the liquid is extracted with ether. The etheral solution is washed with water, dried and evaporated in a vacuum. The residue is saponified while warm with alcoholic alkali solution of 2 per cent. strength and the saponification mixture is poured into water and the whole extracted with ether. The ethereal solution is washed repeatedly with sodium carbonate solution and then with water, whereafter it is evaporated in a vacuum. From the residue androstane-ol-(17)-one-(3) of the formula

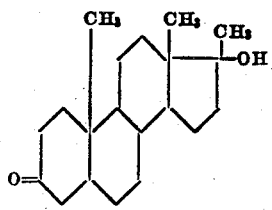

of melting point 182° C. is obtained, for example by recrystallization and/or sublimation in a high vacuum, or by conversion into a sparingly soluble derivative, such as the semicarbazone or dinitrophenylhydrazone derivative.

Instead of a mixture of androstane-diol-17-acetate and cinnamic acid there may be used an androstane-3:17-diol-17-cinnamic acid ester, in which the hydroxyl group to be dehydrogenated and the hydrogen acceptor are united in the same molecule.

*Example 10*

3.06 grams of 17-methyl-androstane-diol-(3:17) of the formula

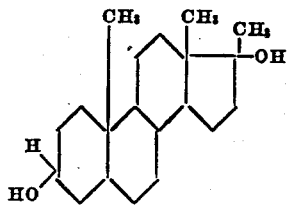

of melting point 185° C. are dissolved in 50 cc. of glacial acetic acid and, at room temperature, there is added in drops a solution of 0.8 gram of chromium trioxide in 50 cc. of glacial acetic acid.

The chromic acid is somewhat rapidly consumed; the whole is allowed to stand for 3 hours at room temperature, then poured into water and the product thus precipitated is dissolved in ether. The ethereal solution is washed with dilute caustic soda solution and water and dried over anhydrous sodium sulfate. From the strongly concentrated ethereal solution the 17-methyl-androstane-ol-(17)-one-(3) of the formula

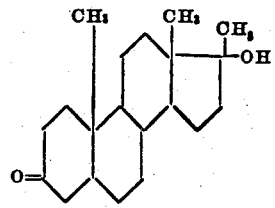

crystallizes. By recrystallization from dilute alcohol it is purified and then melts at 192° C. The semicarbazone obtained in the usual manner melts, after recrystallization from absolute alcohol, at 235° C. while decomposing.

In a similar manner from 17-ethyl-androstane-diol-(3:17) of melting point 205° C. there is obtained the 17-ethyl-androstane-ol-(17)-one-(3) of melting point 126–127° C. and from 3-trans- or 3-cis-17-trans-androstane-diols the androstane-ol-(17)-one-(3) of melting point 182° C.

The reaction proceeds in analogous manner with compounds containing in the 17 position a substituted hydroxyl group, such as an acyloxy- or an alkoxy-group.

*Example 11*

3.04 grams of Δ⁵:⁶-17-methyl-androstene-diol-(3:17) of the formula

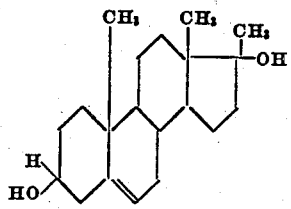

of melting point 202–204° C. are dissolved in 50 cc. of glacial acetic acid and mixed with a solution of 1.6 grams of bromine in 10 cc. of glacial acetic acid. To this solution there is added, by drops, one of 0.8 gram of chromium trioxide in 50 cc. of glacial acetic acid. After several hours standing at room temperature the whole is poured into water, the precipitated dibromide is filtered, washed and treated in glacial acetic acid solution with 3 grams of zinc dust. The filtered solution is then poured into water and the precipitated Δ⁴:⁵-17-methyl-androstene-ol-(17)-one-(3) of the formula

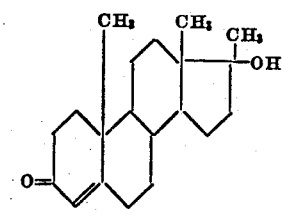

is dissolved in ether. The washed and dried ethereal solution is evaporated and the residue recrystallized from dilute alcohol. Its melting point lies at 161–162° C.

Instead of glacial acetic acid, benzene for example may be used as solvent for the debromination.

In a similar manner Δ⁴:⁵-androstene-ol-(17)-one-(3) of melting point 155° C. can be obtained from Δ⁵:⁶-androstene-diol-(3:17) of melting point 182–183° C.

One may also start from compounds which are acylated in 17-position or substituted in another manner.

*Example 12*

2.88 grams of androstane-dione-(3:17) of the formula

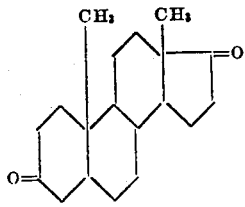

of melting point 134° C. are dissolved in 30 cc. of methyl alcohol and into this solution there is gradually introduced, at boiling temperature, the calculated quantity of sodium. When reduction is complete a precipitate is produced by pouring the mass into water; this is then filtered, washed with much water and dried over phosphorus pentoxide. This product is a mixture of isomeric androstane-ol-ones. The androstane-ol-(17)-one-(3) of the formula

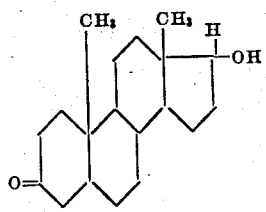

may be separated from it with the aid of digitonin or by way of the semicarbazone and recrystallized from hexane or dilute alcohol for purification.

*Example 13*

2.86 grams of Δ⁴:⁵-androstene-dione-(3:17) of the formula

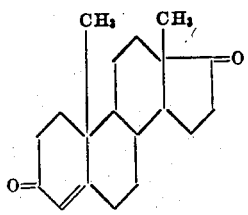

of melting point 173–174° C. are dissolved in alcohol and hydrogenated with the aid of a nickel catalyst. When the amount of hydrogen calculated for one molecule has been absorbed, hydrogenation is interrupted, the catalyst is filtered from the solution, and the latter is poured into 400 cc. of water. The mass is extracted with ether and the ethereal solution is washed with water and evaporated in a vacuum. The residue is esterified by heating for a short time with a few cc. of acetic anhydride; the latter is then evaporated and the residue fractionally crystallized from dilute acetone. In this manner one obtains the Δ⁴:⁵-androstene-ol-(17)-one-(3)-acetate of melting point 141° C. By saponification the corresponding free oxy-ketone is produced, namely Δ⁴:⁵-androstene-ol-(17)-one-(3) of the formula

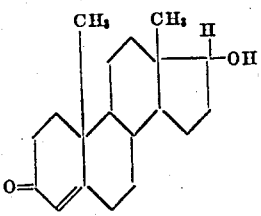

of melting point 155° C.

What we claim is:

1. A process for the manufacture of a compound of the 10,13-dimethylcyclopentanopolyhydrophenanthrene series, comprising oxidizing the 3-carbinol group of a 10,13-dimethylcyclopentanopolyhydrophenanthrene-3:17-diol to a keto group.

2. A process for the manufacture of a compound of the cyclopentanopolyhydro-10,13-dimethylphenanthrene series, comprising oxidizing the 3-carbinol group of a 10,13-dimethylcyclopentanopolyhydrophenanthrene-3:17-diol to a ketone group by means of a dehydrogenating agent.

3. A process as claimed in claim 2, wherein copper is used as a dehydrogenating agent.

4. A process for the manufacture of a compound of the cyclopentanopolyhydrophenanthrene series, comprising oxidizing the 3-carbinol group of a compound of the formula

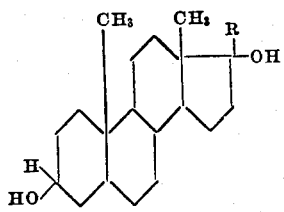

wherein R stands for a monovalent hydrocarbon radical, to a keto group.

5. A process for the manufacture of a compound of the cyclopentanopolyhydrophenanthrene series, comprising oxidizing the 3-carbinol group of a compound of the formula

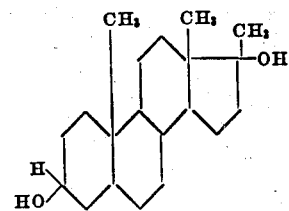

to a keto group.

6. A process for the manufacture of a compound of the cyclopentanopolyhydrophenanthrene series, comprising oxidizing the 3-carbinol group of a compound of the formula

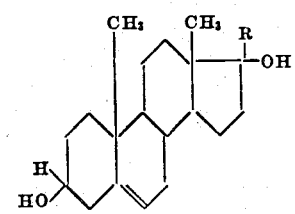

wherein R stands for a monovalent hydrocarbon radical, to a keto group.

7. A process for the manufacture of a compound of the cyclopentanopolyhydrophenanthrene series, comprising oxidizing the 3-carbinol group of a compound of the formula

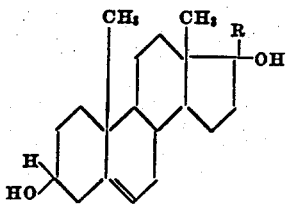

wherein R stands for a monovalent hydrocarbon radical, to a keto group with temporary protection of the carbon double bond present.

8. A process as claimed in claim 5, wherein the temporary protection of the carbon double bond is effected by the addition of halogen before oxidation, and removal of the halogen by halogen eliminating agents after oxidation.

9. A process for the manufacture of a compound of the cyclopentanopolyhydrophenanthrene series, comprising oxidizing the 3-carbinol group of a compound of the formula

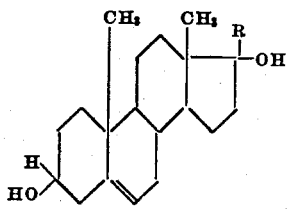

wherein R stands for a monovalent hydrocarbon radical, to a keto group with temporary protection of the carbon double bond present, the temporary protection being effected by the addition of hydrogen halide before oxidation, and removal of the hydrogen halide by hydrogen halide eliminating agents after oxidation.

10. A process for the manufacture of a compound of the cyclopentanopolyhydrophenanthrene series, comprising oxidizing the 3-carbinol group of a compound of the formula

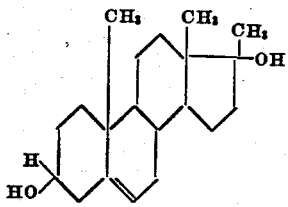

to a keto group with temporary protection of the carbon double bond present, the temporary protection being effected by the addition of hydrogen halide before oxidation, and removal of the hydrogen halide by hydrogen halide eliminating agents after oxidation.

11. A process as claimed in claim 10, wherein copper oxide is used as the oxidizing agent.

12. The saturated 3-keto-10,13-dimethyl cyclopentanopolyhydrophenanthrenes containing in the 17-position the group

wherein $R_1$ stands for a monovalent hydrocarbon radical and $R_2$ is a member of the group consisting of a free, an esterified and an etherified hydroxyl.

13. The compounds of the formula

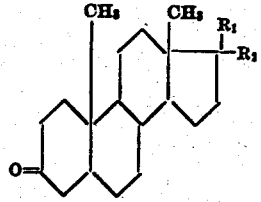

wherein $R_1$ stands for a monovalent hydrocarbon radical, and $R_2$ is a member of the group consisting of a free, an esterified and an etherified hydroxyl.

14. The compounds of the formula

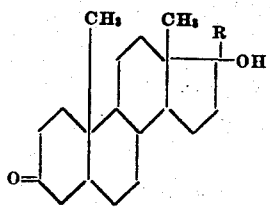

wherein R stands for a monovalent hydrocarbon radical.

15. The compound of the formula

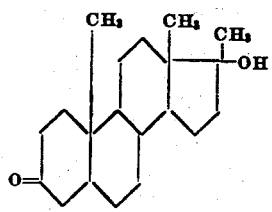

forming colorless crystals of melting point 192° C.

16. The compound of the formula

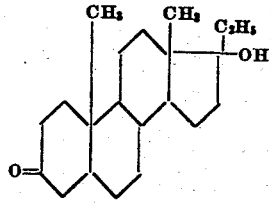

forming colorless crystals of melting point 126–127° C.

17. The compounds of the formula

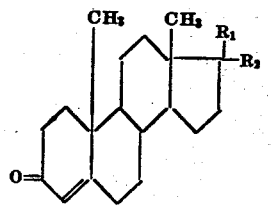

wherein $R_1$ stands for a monovalent hydrocarbon radical, and $R_2$ is a member of the group consisting of a free, an esterified and an etherified hydroxyl.

18. The compounds of the formula

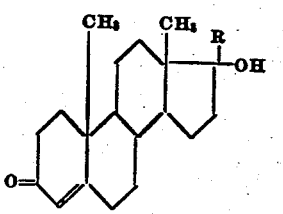

wherein R stands for a monovalent hydrocarbon radical.

19. The compound of the formula

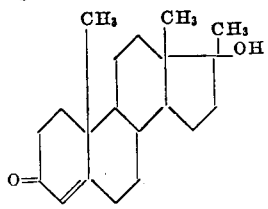

forming colorless crystals of melting point 163–164° C.

20. A method for the production of 17-hydroxy-3-keto compounds of the cyclopentanopolyhydrophenanthrene series, which comprises subjecting a compound of the cyclopentanopolyhydrophenanthrene series of the general formula $C_{19}H_nR_1R_2X$, wherein $n$ stands for an even number from 26 to 28, inclusive, and $R_1$ represents a free secondary alcoholic group at the carbon atom 3, wherein $R_2$ is at the 17-position and stands for a member of the group consisting of a hydroxyl group and a group that can be transformed into a secondary alcoholic group with the aid of hydrolysis, while $X$ is likewise at the 17-position and indicates a hydrocarbon radical, to the action of an oxidizing agent capable of transforming a secondary alcoholic group into a keto group.

LEOPOLD RUZICKA.
ALBERT WETTSTEIN.